No. 12,558.
L. G. NILSON.
ELECTRIC INTERRUPTER.
APPLICATION FILED MAY 25, 1906.
REISSUED NOV. 13, 1906.
FIG. I
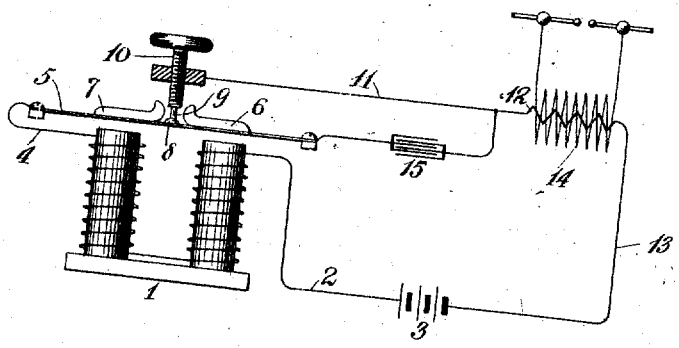
FIG. 2
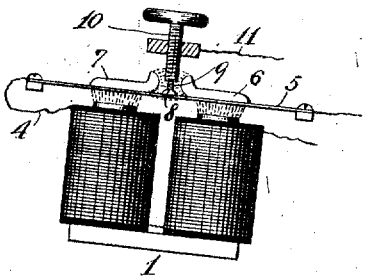
Witnesses
Geo. A. Hoffman
Arnold J. Kelly
Lars G. Nilson Inventor
By his Attorney C. V. Edwards.

UNITED STATES PATENT OFFICE.

LARS G. NILSON, OF HOBOKEN, NEW JERSEY, ASSIGNOR, BY MESNE ASSIGNMENTS, TO THEODORE M. JOHNSON, OF NEW YORK, N. Y.

ELECTRIC INTERRUPTER.

No. 12,558. Specification of Reissued Letters Patent. Reissued Nov. 13, 1906.

Original No. 714,620, dated November 18, 1902. Application for reissue filed May 25, 1906. Serial No. 318,789.

*To all whom it may concern:*

Be it known that I, LARS G. NILSON, a citizen of the United States, and a resident of Hoboken, in the county of Hudson and State of New Jersey, have invented a new and Improved Electric Interrupter, of which the following is a full, clear, and exact description.

This invention relates particularly to interrupters for sparking induction-coils. In induction-coils operated by pulsatory electric current through the primary circuit the inductive effects in the secondary circuit are proportional to the rapidity of the changes in the primary circuit. The highest tension or the brightest spark in the secondary is shown not at the closing but at the opening or breaking of the primary circuit, the cleaner or quicker the break the better the results.

It is well known that in ordinary induction-coils using platinum-tipped contacts in the vibrator even with proper condensers the contact-points will burn or corrode more or less. This burning or arcing not only destroys the points rapidly, but gives poor results in the secondary of the coil. It is also well known that if an electric connection is broken, producing a spark or an arc in the magnetic field, the magnetism will have a tendency to diminish or blow out the spark. In order to produce the best results in induction-coils and at the same time improve the action and prolong the life of the moving parts, I have provided an interrupter in which the magnetism of the interrupter itself is utilized for blowing out the destructive spark at the primary contact-points.

I will describe an electric interrupter embodying my invention and then point out the novel features in the appended claims.

Reference is to be had to the accompanying drawings, forming a part of this specification, in which similar characters of reference indicate corresponding parts in both the figures.

Figure 1 is an elevation of an interrupter embodying my invention, showing the same in circuit with an induction-coil or sparking coil; and Fig. 2 is an elevation showing the action in the magnetic field.

Referring to the drawings, 1 designates a two-pole electromagnet connected at one end through a wire 2 with a battery 3, the other end of the electromagnet being connected through a wire 4 with a vibratory strip 5 of non-magnetic metal. This strip 5 is supported across the poles of the electromagnet, and arranged on the upper side of the strip are the armatures 6 7, having opposite polarities and magnetically separated, each armature being opposite one pole of the magnet. Secured to the strip 5 between the inner ends of the armatures is a platinum contact-point 8, designed to be engaged by a platinum point 9 on an adjusting-screw 10. It will be noted that the inner ends of the armatures are curved upward and that both contact-points 8 and 9 are wholly embraced in the enlarged field provided by so upwardly curving the ends. The point 9 through the screw 10 and its support is connected by a wire 11 with the primary 12 of the induction-coil, the said primary being also connected, by means of a wire 13, with the battery 3.

The secondary 14 of the induction-coil is connected in the usual manner with the sparking points.

A condenser 15 is in connection with the wire 11 and with one end of the strip 5.

The circuit may be traced from the battery through the wire 2, the electromagnet, the wire 4, the vibratory strip 5, the contacts 8 and 9, the screw 10, the wire 11, the primary of the induction-coil, and back to the battery.

In my device the general action is of course substantially the same as that in any other similar system of induction-coil; but my improvement consists, essentially, in placing the contacts of the interrupter in a powerful magnetic field, the magnetic action of which is shown in dotted lines in Fig. 2.

Having thus described my invention, I declare that what I claim as new, and desire to secure by Letters Patent, is—.

1. An interrupter comprising an electromagnet arranged in an electric circuit, a vibratory strip extended across the poles of the electromagnet and armatures arranged on the strip, substantially as described.

2. An interrupter comprising an electromagnet arranged in an electric circuit, comprising an induction-coil, the vibratory strip extended across the poles of the magnet, the armatures arranged on said strip, the contact-point attached to the strip between the armatures, and a contact-point having connection with the induction-coil and coacting with the first-named contact-point, substantially as described.

3. In an interrupter, an electromagnet arranged in an electric circuit comprising an induction-coil, a vibratory strip of non-magnetic material extended over the poles of the electromagnet, the armatures arranged on said strip, the inner ends being curved upward, a contact-point attached to the strip between the inner ends of the armatures, and another contact-point in connection with the induction-coil and coacting with the first-named contact-point, substantially as described.

4. In an interrupter, the combination of an electromagnet, a vibratory strip carrying a contact-point, and armatures mounted on said strip at opposite sides of the contact-point, substantially as described.

5. An interrupter having a contact-point arranged in a magnetic field and carried with a vibrating armature, substantially as described.

6. An interrupter having a contact-point arranged in a magnetic field between the poles of a magnet and an armature at each side thereof, the parts being so arranged that the flux passes in a transverse direction across the contact-point, substantially as described.

7. An interrupter having a contact-point arranged in a magnetic field between the poles of a magnet and carried between two vibratory armatures, substantially as described.

8. The combination with an interrupter having a vibratory armature and contact-point, of a magnet, the parts being so located that the field of the magnet is directed through the contact-point, substantially as described.

9. The combination with an interrupter having a vibratory contact-point, of a magnet controlled by the vibrations of said contact-point, and an armature moving with the contact-point and located so as to direct the field of the magnet in a transverse direction across the contact-point, substantially as described.

10. The combination with an interrupter having a movable and a fixed contact-point located in the circuit of an induction-coil, of a magnet, and means whereby the field of the magnet passes in a transverse direction across said contact-points, substantially as described.

11. The combination with an interrupter comprising a vibratory strip, a magnet, and movable and fixed contacts, of means whereby the field of the magnet is directed through the contacts, substantially as described.

12. The combination with an interrupter comprising a vibratory strip carrying an armature, of a magnet, and movable and fixed contacts, the contacts being located so as to receive the flux from the armature, substantially as described.

13. The combination with an interrupter comprising a non-magnetic vibratory strip carrying an armature, of a magnet, movable and fixed contacts, the contacts being located so as to receive the flux from the magnet, substantially as described.

14. The combination with a vibratory strip carrying a contact, of armatures having opposite polarities at either side of said contact, substantially as described.

15. The combination with an interrupter comprising a vibratory strip carrying separated armatures, of a magnet, movable and fixed contacts disposed between the armatures, the parts being so arranged that the magnetic flux passes from one part of the armature through the contacts to the other, substantially as described.

16. The combination with an interrupter comprising a vibratory strip carrying an armature, of a magnet having a pole opposite said armature, and a contact adjacent one end thereof in such position as to receive the magnetic flux from the armature, substantially as described.

17. The combination with an interrupter comprising a non-magnetic vibratory strip carrying an armature, of a magnet having a pole opposite said armature, and a contact adjacent one end thereof in such position as to receive the magnetic flux from the armature, substantially as described.

18. The combination with an interrupter comprising a non-magnetic vibratory strip carrying an armature, of a two-pole magnet having one of its poles opposite said armature, and a contact on said strip between said armature and the other pole of the magnet, substantially as described.

19. An interrupter comprising a strip, a magnet for vibrating it, and a contact-point on the strip disposed in the field of said magnet, substantially as described.

20. An interrupter comprising a vibratory strip carrying a contact, and coöperating means disposed at either side of said contact for directing the magnetic flux through the contact, substantially as described.

21. The combination with the primary of an induction-coil, of an interrupter therein having a contact-point arranged in a magnetic field, substantially as described.

22. The combination with the primary of an induction-coil, of an interrupter therein having a contact-point arranged in a magnetic field, and carried with a vibrating armature, substantially as described.

In testimony whereof I affix my signature, in the presence of two witnesses, this 23d day of May, 1906.

LARS G. NILSON.

In presence of—
JULIAN S. WOOSTER,
C. V. EDWARDS.